United States Patent

Tsumori et al.

[11] Patent Number: 5,650,827
[45] Date of Patent: Jul. 22, 1997

[54] APPARATUS FOR DISPLAYING INHIBITED MENU FUNCTIONS IN A TELEVISION RECEIVER

[75] Inventors: Koki Tsumori, Tokyo; Toshihide Hayashi, Kanagawa, both of Japan

[73] Assignee: Sony Corporation, Tokyo, Japan

[21] Appl. No.: 942,615

[22] Filed: Sep. 10, 1992

[30] Foreign Application Priority Data

Sep. 10, 1991 [JP] Japan .................. 3-258583

[51] Int. Cl.$^6$ .............. H04N 5/45; H04N 5/445
[52] U.S. Cl. .............. 348/565; 348/569; 348/706
[58] Field of Search .................. 348/565, 569,
348/601, 734, 566, 567, 564, 563, 553,
570, 687, 706, 725; 395/156; 345/145,
146, 147, 160, 157, 158; H04N 5/45, 5/44,
5/445

[56] References Cited

U.S. PATENT DOCUMENTS

| | | | |
|---|---|---|---|
| 4,725,888 | 2/1988 | Hakamada | 358/183 |
| 4,769,626 | 9/1988 | Herrera | 338/185 |
| 4,907,082 | 3/1990 | Richards | 348/569 |
| 5,146,210 | 9/1992 | Heberle | 348/734 |
| 5,208,910 | 5/1993 | Higgins et al. | 395/156 |
| 5,210,611 | 5/1993 | Yee et al. | 348/569 |
| 5,237,417 | 8/1993 | Hayashi et al. | 348/565 |

FOREIGN PATENT DOCUMENTS

| | | | |
|---|---|---|---|
| 58-178678 | 10/1983 | Japan | H04N 5/44 |
| 3091385 | 4/1991 | Japan | H04N 5/782 |
| 2155714 | 9/1985 | United Kingdom | H04N 5/44 |

OTHER PUBLICATIONS

"Works Companion" by Cobb et al., The Cobb Group, Inc., 1987, pp. 12-23.
Macintosh Reference Manual (1984), p. 17.
Myers, Brad A., Window Interfaces, IEEE Computer Graphics and Application 8 (5):65–84 (1988); USA.

*Primary Examiner*—Safet Metjahic
*Attorney, Agent, or Firm*—Jay M. Maioli

[57] ABSTRACT

A display microcomputer displays a menu corresponding to several functions, such as picture-in-picture display and satellite broadcast reception on a mini-viewing screen that is part of the cathode-ray tube picture screen of a television receiver. A remote controller permits selection of different video and audio signal sources and, if the user selects sources that are incompatible or inconsistent, a system controller returns the menu to the condition prior to the incorrect selection. The system controller also controls a display microcomputer in such a way that items on the menu that are inhibited from selection are displayed in halftone. That is, if any inhibited item appears in the menu by a modification of the mode of operation, the display microcomputer is controlled so that the menu is returned to the condition prior to the selection and the inhibited item is displayed in halftone. For example, erroneous operation that would change the reproduced sound of a duplex sound channel while the user is watching a picture reproduced from a video tape recorder is prevented, because the set value for the duplex sound can not be varied by the user.

5 Claims, 9 Drawing Sheets

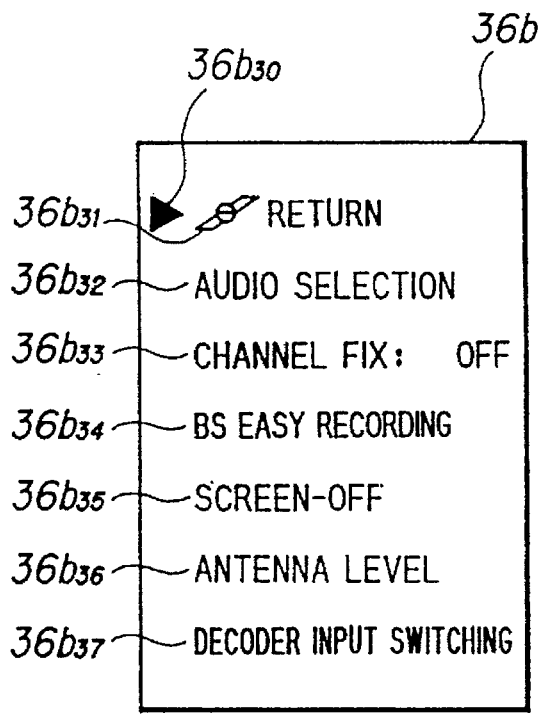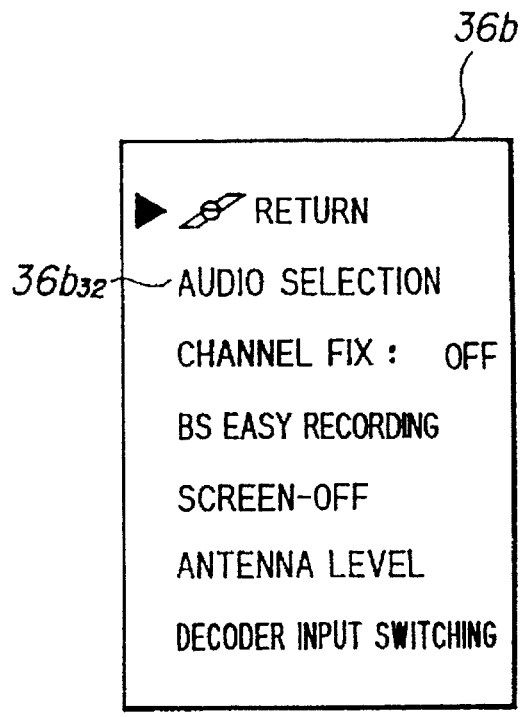
FIG.8a  FIG.8b
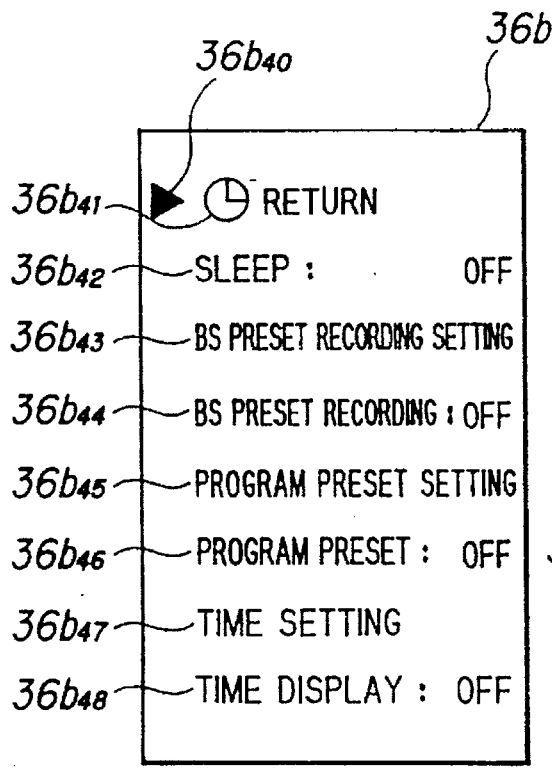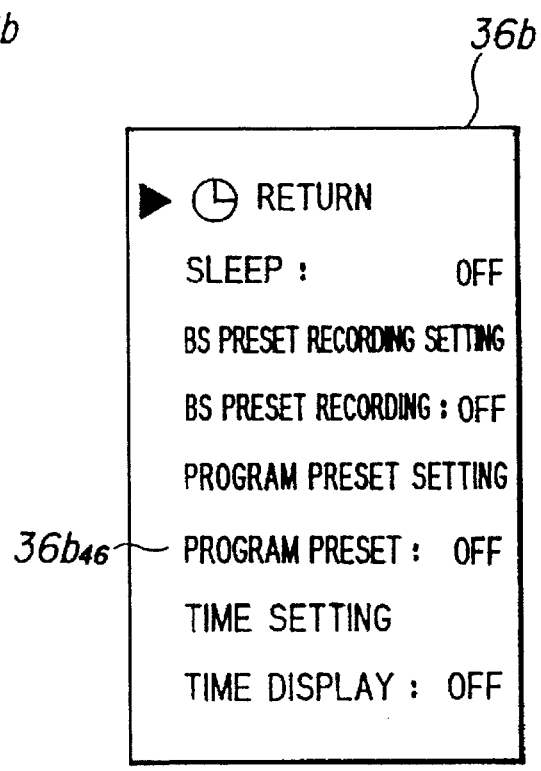
FIG.9a  FIG.9b

APPARATUS FOR DISPLAYING INHIBITED MENU FUNCTIONS IN A TELEVISION RECEIVER

BACKGROUND OF THE INVENTION

1. Field of the Invention

The present invention relates generally to a television receiver and, more particularly, to a television receiver capable of providing a picture-in-picture display, of displaying the contents of manual operations performed for recording of programs, of displaying the reception level at the satellite broadcast reception antenna, and of displaying a plurality of items to be set such as the volume of reproduced sound.

2. Description of the Background

In recent years, an increasing number of television receivers have included the so-called picture-in-picture function. In that format, the whole viewing screen is treated as the main viewing screen, and part of the main screen is used as a mini-viewing screen. The images from another, different channel are displayed on this smaller screen area. In addition, television receivers are available that permit the user to make reservations for subsequent recording of desired programs on a video tape recorder. Furthermore, some television receivers are equipped with a satellite broadcast reception tuner, hereinafter referred to as a BS tuner. Thus, it is seen that television receivers have tended to become more sophisticated in their functions beyond merely displaying images from a selected channel.

In a television receiver having such sophisticated, multiple functions, the man/machine interface needs to be improved to permit the user to easily and sufficiently utilize the various functions of the receiver. In particular, the various manual operations, the sequence in which such manual operations are performed, the condition of the signal being received, and so on can be displayed on the mini-viewing screen to improve the operability of the receiver. The items in such a display are commonly referred to as the menu.

For example, when the user performs an operation to display the menu items, hereinafter referred to as the main menu, that have been set up according to the functions of the television receiver are displayed on the mini-viewing screen. At that time a cursor is displayed simultaneously with these set items, and the cursor can be moved using a remote controller to select an item. In response to the selected item, new items such as the various operations and the sequence in which the operations are carried out can be displayed. For example, when a program is to be recorded a recording menu having items such as the recording start time, the recording end time, and the channel number are displayed. Then, the program is reserved according to the newly displayed contents of operations and the sequence of the operations. At that time, the starting time of the recording, the ending time of the recording, the channel number, and the like are set or entered.

When a picture-in-picture display is provided, the user can perform an operation for displaying the main menu. Then, the user selects item for setting various parameters of the mini-screen in the main menu displayed on the mini-screen. Thus, various parameters like the switching of various picture signal sources, such as the VHF/UHF tuner, the BS tuner, or a video tape recorder, for displaying a picture on the mini-viewing screen, setting the channel, setting the sound volume at an earphone, setting the position of the mini-viewing screen, and setting the size of the mini-viewing screen are displayed as new set items. These set items can be referred to as the mini-viewing screen menu. The user then changes the picture signal source and determines the channel by using the remote controller, while watching the mini-viewing screen. Finally, the user selects the source of the signal to be shown on the mini-viewing screen display. As a result, the picture of a UHF/VHF broadcast program, for example, is displayed on the main viewing screen, while the images according to the picture signal reproduced by the video tape recorder are displayed on the mini-viewing screen.

In a normal mode, the images according to the picture signal from the VHF/UHF tuner are displayed and, in this normal mode, if items that are set are selected in the main menu then new items to be set, such as switching between the sounds of duplex sound, setting ON or OFF the output from the loudspeakers, and setting ON or OFF the sound confirming the operation of the remote controller are displayed on the mini-viewing screen. For example, the user can switch the reproduced sound to the auxiliary sound of the duplex sound by using the remote controller, while watching the displayed menu. As a result, only the auxiliary sound is produced from the speakers.

The problem arises though that if the picture signal source is switched to the video tape recorder after the channel has been set using the aforementioned mini viewing screen menu, or after the reproduced sound has been switched to the auxiliary sound of the duplex sound in the above-described various item menu, then the mini-viewing screen menu or the various set item menu is displayed on the mini-viewing screen as it is, even though the video tape recorder has neither the channel switching function nor the switching function of the duplex sound mode. Therefore, in a mode of operation that uses the video tape recorder as the source, the channel will be switched or the duplex sound mode will be changed. More specifically if the channel is switched in the mode of operation using the video tape recorder as the source, the channel of the VHF/UHF tuner is switched but the picture according to the picture signal supplied from the video tape recorder remains displayed on the viewing screen. Therefore, it has been impossible for the user to check if the channel of the VHF/UHF tuner has been switched in actuality. Furthermore, in the mode of operation using the video tape recorder as the source, if the channel or the duplex sound mode is changed erroneously, it is also impossible for the user to check on that situation.

OBJECTS AND SUMMARY OF THE INVENTION

Accordingly, it is an object of the present invention to overcome the above drawbacks inherent in previously proposed systems.

It is another object of the present invention to provide a television receiver that has multiple, highly advanced functions and is capable of operating in a mode using a BS tuner as the source and in a mode using a video tape recorder as the source and in which when the mode of operation is changed the receiver inhibits the setting of these functions after the mode of operation is changed and is capable of informing the user of this inhibition, thereby improving the operability.

According to an aspect of the present invention the above problems are solved by a television receiver operating in a plurality of modes, in which the receiver comprises a display for presenting a plurality of set items on the display portion on which a picture is displayed, according to the modes of operation, the set items including inhibited items; a setting circuit that sets the set items displayed by the display and determines set values; and a control system in which when the present mode of operation is changed, the setting circuit is controlled in such a way that if at least one of the previously set items is inhibited in the new mode of operation, the inhibited items are returned to the condition prior to the setting mode by the setting circuit.

In the television receiver of the present invention, when a plurality of set items including inhibited items corresponding to various modes of operation are displayed on the display portion that provides a display of pictures and some of the displayed set items are selected to determine set values, if at least one of the preset items is inhibited in the new mode of operation, then the inhibited item is returned to the condition prior to the setting mode by the setting circuit.

The above and other objects, features, and advantages of the present invention will become apparent from the following detailed description of illustrative embodiments thereof, to be read in connection with the accompanying drawings in which like reference numerals represent the same or similar elements.

BRIEF DESCRIPTION OF THE DRAWINGS

FIGS. 8a and 8c are images corresponding to an example of the BS set menu;

FIG. 9a and 9b are images corresponding to an example of the timer set menu;

DETAILED DESCRIPTION OF PREFERRED EMBODIMENTS

Figure 1:
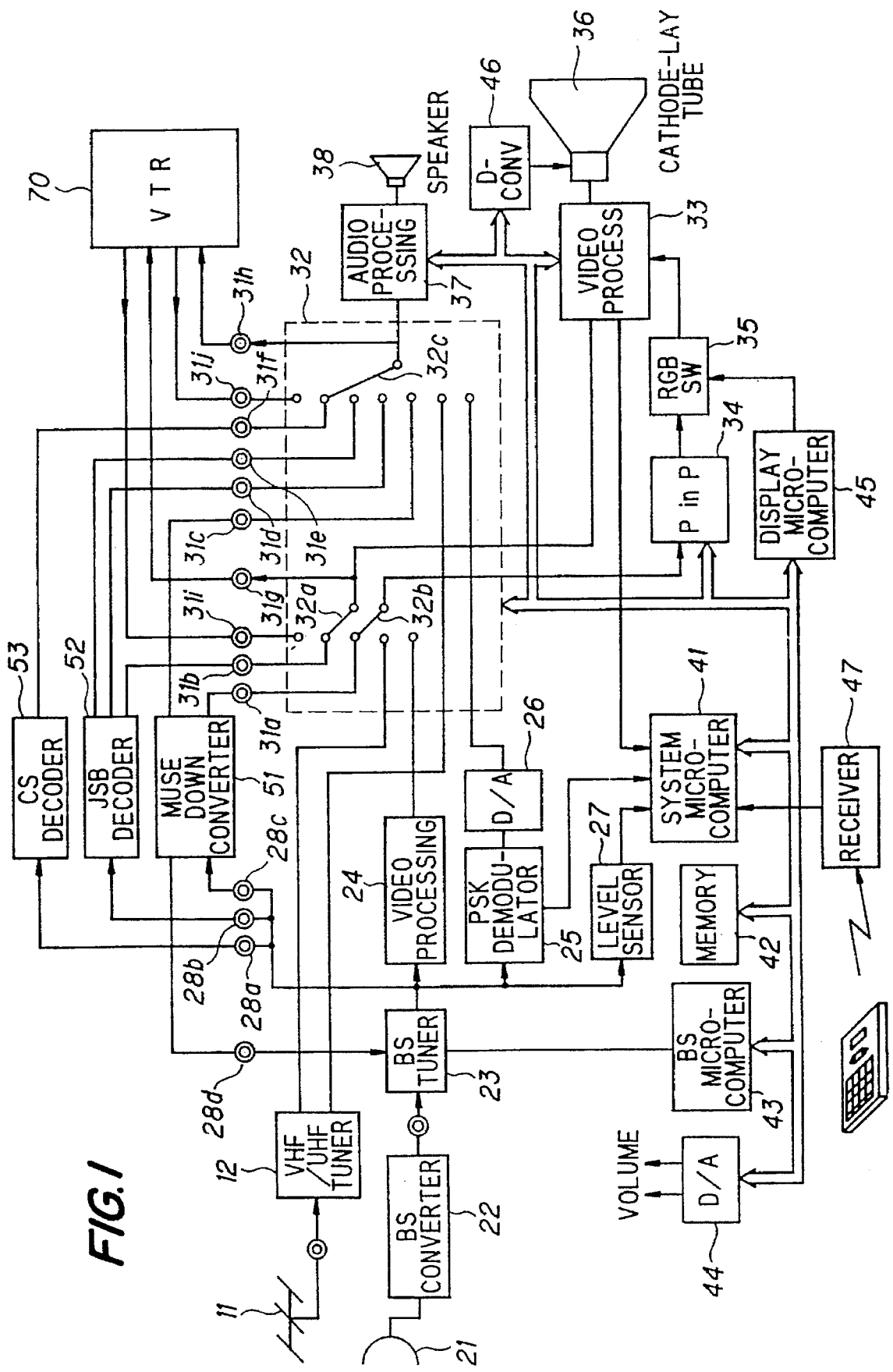
FIG. 1 is a block diagram showing the circuit configuration of a television receiver according to an embodiment of the present invention.

In a preferred embodiment the present invention is applied to a television receiver incorporating a broadcast satellite tuner, and FIG. 1 is a block diagram showing the circuit configuration of this television receiver. This television receiver comprises a terrestrial broadcast reception portion, a satellite broadcast reception portion, an output portion, and a control portion that controls the other portions. The terrestrial broadcast reception portion selects the signal of the desired channel from VHF and UHF signals and reproduces color television signals and sound signals conforming to the NTSC standard. The satellite broadcast reception portion selects the desired channel from broadcasts, referred to as the BS broadcasts, using broadcasting satellites or from broadcasts utilizing communications satellites, referred to as the CS broadcasts, and reproduces color television signals and sound signals conforming to the NTSC standard. The output portion selects desired ones from the color television signals and sound signals from the terrestrial broadcast reception portion, from the satellite broadcast reception portions, and from an external decoder and displays the selected signals on the viewing screen.

As shown in FIG. 1, an antenna 11, such as a Yagi antenna, is connected to the terrestrial broadcast reception portion. This terrestrial broadcast reception portion consists of a VHF/UHF tuner 12 that selects the signal of the desired channel from the VHF or UHF signals received by the antenna 11, processes the signal of the selected channel, for example, by amplifying and detecting the signal, and reproduces the color television signal and the sound signal. The color television signal and the sound signal are then fed to an output portion.

As shown in FIG. 1, a BS converter 22 amplifies the signal in the 12 GHz band of a BS broadcast received by a BS antenna 21, such as a parabolic antenna, and converts the signal to the 1 GHz band. The converted signal is then connected with the terrestrial broadcast reception portion. This terrestrial broadcast reception portion comprises a BS tuner 23, a video processor 24 for converting the picture signal from the tuner 23 into a color television signal conforming to the NTSC standard, a phase-shift keying (PSK) demodulator 25, and a digital-to-analog converter (D/A) 26 for converting the pulse-code modulation (PCM) sound signal from the PSK demodulator 25 into analog form and supplying it to the output portion. The terrestrial broadcast reception portion further includes a level detector circuit 27 for detecting the reception level at the BS antenna 21 based on the output from the BS tuner 23 in the 8 MHz band, external output terminals 28a, 28b, 28c for supplying the output from the BS tuner 23 to an external decoder, and an external input terminal 28d for supplying keyed AFC pulses in the Multiple Sub-Nyquist Encoded signal (MUSE) from the external decoder to the BS tuner 23. This BS tuner 23 selects the signal of the desired channel from the output signal of the BS converter 22, subjects the signal of the selected channel to signal processing, for example, automatic gain control, IF amplification, FM demodulation, de-emphasis, and energy dispersion-and-removal, reproduces a picture signal and a sound signal that is modulated by phase-shift keying (PSK) and pulse code modulation (PCM), and supplies these signals to the external decoder. This sound signal will be referred to as the PCM sound signal. The PSK demodulator 25 demodulates the PSK-modulated PCM sound signal from the BS tuner 23, reproduces PCM sound signals for four channels in the A mode of BS broadcasts and PCM sound signals and for two channels in the B mode, selects and delivers at least one of the PCM sound signals that are reproduced, and senses whether the PCM sound signals are scrambled.

The BS antenna 21 efficiently gathers quite weak electromagnetic waves from a broadcasting satellite or a communications satellite and supplies them to the BS converter 22. The BS converter 22 converts the signals into the 1 GHz band and supplies them to the BS tuner 23. The satellite broadcast reception portion selects the signal of the desired channel, such as the BS-3 channel (Japan Satellite Broadcast), the BS-7 channel (NHK), the BS-11 channel (NHK), or a communications satellite broadcast and supplies the signal of the selected channel to the external decoder via the external output terminals 28a–28c, if the signal is a MUSE signal or a scrambled signal. Otherwise, this reception portion converts the signal into a color television signal conforming to the NTSC standards and supplies it to the output portion. If the sound signal is in the A mode, the television sound signals of the two channels corresponding to the contents of the picture signals from the reproduced four channels are distinguished from the sound signals of the two channels not corresponding to the contents of the picture signals are selected. In the case of the B mode, the television sound signal of the two channels corresponding to the contents of the picture signals are supplied to the output portion.

This television receiver is designed so that an external decoder is to be connected to the receiver. If the BS broadcast is a high-definition television program or a pay broadcast program, that is, when either a MUSE signal or a scrambled signal is received, the external decoder converts the output signal from the BS tuner 23 either into an unscrambled color television signal conforming to the NTSC standard or into an unscrambled sound signal. As shown in FIG. 1, this external decoder comprises a MUSE down-converter 51, a JSB decoder 52, and a CS decoder 53. The MUSE down-converter 51 decodes the MUSE signal supplied from the BS tuner 23 via the external output terminal 28c, reproduces a high-definition TV signal, then converts it into a color TV signal conforming to the NTSC standard. The down-converter 51 also decodes the received PCM sound signals, which were encoded by DPCM near-instantaneous compressing and expanding and time-division multiplexed during the vertical retrace periods of the video signal, and reproduces the sound signals, so that both the color TV signal and the sound signal are fed to the output portion. The JSB decoder 52 descrambles the scrambled picture signal supplied from the BS tuner 23 via the external output terminal 28b to reproduce a color TV signal, demodulates the received PSK-modulated, scrambled PCM sound signal that was multiplexed with the picture signal by frequency-division multiplexing, then descrambles and decodes the scrambled PCM sound signal to reproduce the TV sound signal and independent sound signals. The color TV signal and sound signals are then fed to the output portion. The CS decoder 53 demodulates the PSK-modulated, scrambled PCM sound signal supplied from the BS tuner 23 via the external output terminal 28a, then descrambles and decodes the scrambled PCM sound signal to reproduce a sound signal, and supplies this sound signal to the output portion.

If the satellite broadcast is a high-definition broadcast program or a pay broadcast program, that is, if the received signal is a MUSE signal or is scrambled, the external decoder converts the output signal from the BS tuner 23 into an unscrambled color TV signal conforming to the NTSC standard and also into an unscrambled TV sound signal and independent sound signals. The decoded color TV signal and sound signals are then supplied to the output portion.

As shown in FIG. 1, the output portion comprises external input terminals 31a, 31b, 31c, 31d, 31e, and 31f by which the above-described external decoder is connected, an AV switch 32 for selecting color TV signals and sound signals either from the VHF/UHF tuner 12 or the video processor circuit 24 or the MUSE down-converter 51, or from the JSB decoder 52, or the CS decoder 53. The output portion also includes a video processor circuit 33, which consists of a video amplifier circuit, a chrominance signal-reproducing signal, or the like that operate to convert the color TV signal selected by the AV switch 32 into three primary color signals. The output portion further includes a picture-in-picture processing circuit 34 for performing processing to provide a picture-in-picture display, an RGB switch 35 that switches between the three primary color signals from the picture-in-picture processing circuit 34 and three primary color signals delivered from the control portion to determine the color of the display of the set items for the plural functions of this television receiver and supplies the selected three primary color signals to the video processor circuit 33. A cathode-ray tube 36 is provided to display the three primary color signals from the video processor circuit 33, and an audio processor 37 processes the sound signal selected by the AV switch 32 to adjust the sound quality, for example, of the sound produced by a loudspeaker 38. External output terminals 31g, 31h supply the color TV signal and the sound signal selected by the AV switch 32 to the video tape recorder (VTR) 70 that is connected to the output side to record programs, and external input terminals 31i, 31j supply the color TV signal and sound signal from the VTR 70 to the AV switch 32 to permit the user to watch the picture reproduced by the VTR 70.

As shown in FIG. 1, the above-described AV switch 32 comprises a selector switch 32a for selecting one of the color TV signals supplied from the MUSE down-converter 51, the JSB decoder 52, or the VTR 70 via the external input terminals 31a, 31b, 31i, respectively, and for selecting one of the color TV signals from the VHF/UHF tuner 12 or from the video processor circuit 24 and for supplying the selected signals to the video processor circuit 33. AV switch 32 also includes a selector switch 32b for selecting one of the color TV signals supplied from the MUSE down-converter 51, the JSB decoder 52, or the VTR 70 via the external input terminals 31a, 31b, 31i, respectively, and selecting one of the color TV signals from the VHF/UHF tuner 12 or from the video processor circuit 24 and for supplying the selected signals to the picture-in-picture processing circuit 34. AV switch 32 further includes a selector switch 32c for selecting one of the sound signals supplied from the MUSE down-converter 51, the JSB decoder 52, the CS decoder 53, or the VTR 70 via the external input terminals 31c–31f, 31j, respectively, and for selecting one of the sound signals from the VHF/UHF tuner 12 and the D/A converter 26 and for supplying the selected signals to the audio processor circuit 37.

When the picture signal and the sound signal of the selected channel are not scrambled, the output portion displays the picture according to the color TV signal from the video processor circuit 24 on the CRT 36 and produces sound from the loudspeaker 38 according to the TV sound signal from the D/A converter 26 or according to an independent sound signal under control of the control portion. This is referred to as the internal mode, and when the TV sound is produced, the mode is referred to as the TV sound mode, whereas when an independent sound is produced, the mode is referred to as the independent sound mode. On the other hand, when the picture signal and sound signal of the selected channel are scrambled, the output portion presents the picture on the CRT 36 according to color TV signals obtained by descrambling using the JSB decoder 52. Also, the output portion produces sound from the loudspeaker 38 according to the descrambled TV sound signal or independent sound signal. This mode is referred to as the external mode. The output portion can provide a picture-in-picture display, or display the contents of operations according to various functions such as reception of a BS broadcast and reservation of recording of a program, or display the set items, that is, the menu, to indicate the order of the operations.

To record pictures of a program, the color TV signal and sound signal selected by the AV switch 32 are fed to the VTR 70 via the external output terminals 31g and 31h, respectively.

As shown in FIG. 1, the control portion comprises a system controller 41, a memory 42 consisting of a nonvolatile memory for storing a program such as the contents of a control operation and set values, a BS microcomputer 43 that controls the tuning of the BS tuner 23 according to the data from the system controller 41, a D/A converter 44 that converts data from the system controller 41 into analog form to control the sound volume, a display microcomputer 45 that displays the menu according to data from the system controller 41, a divergence converter 46 for controlling the deflection of the CRT 36 according to data from the system controller 41, and a reception circuit 47 that receives signals in the form of infrared radiation from the remote controller 60 and converts the infrared radiation into electrical signals fed to the system controller 41.

This system controller 41 controls the various portions beginning with the terrestrial broadcast reception portion and ending with the output portion, depending on the control signals from a control section installed on the front panel of this television receiver and from the remote controller 60, and on whether the PCM sound signal or the like from the PSK demodulator 25 is scrambled or not, depending on the reception level at the level detector circuit 27, and depending on the presence or absence of a color TV signal from the video processor circuit 33. The system controller 41, the video processor circuit 33, the picture-in-picture processing circuit 34, the audio processor circuit 37, and the portion between the memory 42 and the converter 46 are interconnected by a so-called I²C bus.

Figure 2:
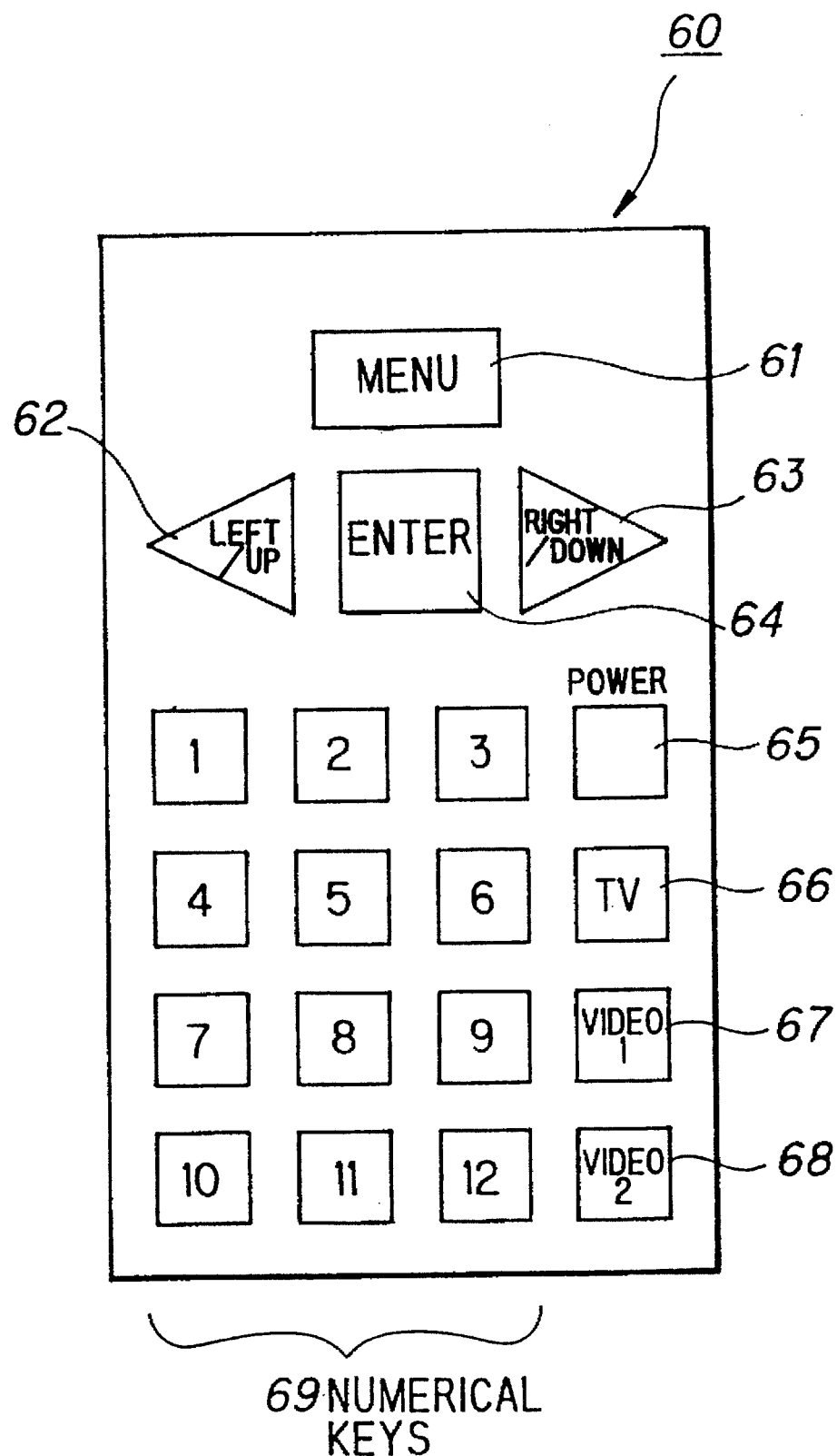
FIG. 2 is a plan view pictorially showing the manually operated portion of a remote controller used in the television receiver of FIG. 1.

As shown in FIG. 2, the manual control portion of the remote controller 60 comprises a menu switch 61, cursor switches 62, 63 for moving a cursor horizontally and vertically, respectively, a decision switch 64 for selecting the item indicated by the cursor, a power switch 65 for turning on or off the power supply, input selector switches 66, 67, 68 for selecting the source of the color TV signal supplied to the television receiver, and numerical keys 69 for selecting the channel. The menu switch 61 takes the whole viewing screen of the CRT 36 as the main viewing screen, and the picture-in-picture display takes a part of the screen of the CRT as the mini-viewing screen, and the menu according to the functions of the television receiver is displayed on this mini-viewing screen.

If the user performs an operation, using the remote controller 60, for example, to set the channel to the BS-7 channel, the control portion selects the BS-7 channel of the satellite broadcast. The color TV signal from the video processor circuit 24 is selected by the AV switch 32, and the picture displayed on the CRT 36. The sound signal from the D/A converter 26 is selected by AV switch 32. In the case of the A mode, the TV sound or an independent sound is produced from the loudspeaker 38 and, in the case of the B mode, the TV sound is produced from the speaker 38. In this way, controls are provided in the internal mode.

For example, when the user has set the channel to the BS-3 channel, the control portion determines whether the PCM sound signal of the BS-3 channel is scrambled or not. If the signal is scrambled, that is, if the broadcast is a pay program, then the control portion sends the picture signal from the BS tuner 23 to the JSB decoder 52, where the signal is decoded. The descrambled color TV signal is then selected by the AV switch 32, and the picture is displayed on the CRT 36. One of the TV sound signal and the independent sound signal obtained by descrambling of the JSB decoder 52 is selected by the AV switch 32 and sound is produced from the loudspeaker 38. In this way, controls are provided in the external mode. If the signal is not scrambled, that is, if the broadcast is a free program, then the color TV signal from the video processor circuit 24 is selected by the AV switch 32, and the picture is displayed on the CRT 36. At the same time, the sound signal from the D/A converter 26 is selected by the AV switch 32 and, specifically, the TV sound or independent sound is produced from the loudspeaker 38 in the case of the A mode and the TV sound is produced from the loudspeaker 38 in the case of the B mode. In this manner, controls are provided in the internal mode. In either of the internal and external modes, the independent sound signal is selected in the independent sound mode. In that mode, if the user sets a picture blank mode to reduce electric power consumption, or for some other purpose, then the BS converter 22, the BS tuner 23, the PSK demodulator 25, the D/A converter 26, the audio processor circuit 37, and the system controller 41 are energized, while the other circuits including the video processor circuit 33 for displaying the picture are de-energized.

As an example, if the user who records a pay broadcast program of the BS-3 channel records the TV sound, and if the user sets a channel locking mode to inhibit switching of the channel for preventing unintentional switching of the channel during the recording to thereby prevent failing to record the desired channel, then the control portion selects the BS-3 channel of the satellite broadcast and supplies the color TV signal and the TV sound signal of this channel to the VTR 70 via the external output terminals 31g and 31h. Also, the control portion controls the BS tuner 23, the AV switch 32, and the other relevant circuits to lock the channel and the sound in case the user acts to change the channel or the TV sound signal or the independent sound signal by using the remote controller 60, for example.

If the user performs an operation for displaying the menu as the need arises, the control portion controls the display microcomputer 45 and other relevant circuits to display the sequence of operations for recording a BS broadcast, for example. The display is in the form of a menu within the mini-viewing screen. If the user performs an operation to provide a picture-in-picture display as the need arises, then the control portion controls the AV switch 32, the picture-in-picture processing circuit 34, and other relevant circuits to display a BS broadcast program in the main viewing screen and a terrestrial broadcast program in the mini-viewing screen.

More specifically, if the user sets the channel number by using the numerical keys 69 on the remote controller 60 to watch a program on a desired channel from a terrestrial broadcast, then the system controller 41 receives a control signal indicating the channel number from the remote controller 60, controls the VHF/UHF tuner 12 to select the signal of the selected channel, and controls the selector switches 32a, 32c to select the color TV signal and the sound signal from the tuner 12. The selected color TV signal is supplied to the video processor circuit 33, while the sound signal is furnished to the audio processor circuit 37.

The video processor circuit 33 converts the color TV signal from the selector switch 32a into three primary color signals and supplies the signals to the CRT 36. The audio processor circuit 37 processes the sound signal from the selector switch 32c, for example, it adjusts the sound quality and supplies the signal to the loudspeaker 38. As a result, the user can watch programs of the desired channel of a terrestrial broadcast.

At this time, the system controller 41 supplies data indicating the channel number to the display microcomputer 45 via the I²C bus to permit the user to check the effects of the manual operations, for example, to check what channel number has been set. In response to this data, the display microcomputer 45 supplies three primary color signals to the video processor circuit 33 via the RGB switch 35 to display the channel number at the right upper corner, for example, of the viewing screen. The video processor circuit 33 converts the color TV signal from the selector switch 32a into three primary color signals and superimposes the signals from the RGB switch 35 onto the converted three primary color signals. As a result, the channel number is superimposed on the picture of the terrestrial broadcast program.

If the user sets the channel to the BS-11 channel using the remote controller 60 to watch programs of the desired channel of a BS broadcast, the system controller 41 receives a control signal indicating the channel number from the remote controller 60 and controls the BS tuner 23 to tune to the signal of the BS-11 channel. The system controller also senses whether the present program is an ordinary broadcast program conforming to the NTSC standards or a high-definition broadcast program based on the PCM sound signal from the PSK demodulator 25 and on the reception signal level at the level detector circuit 27. If the present program is an ordinary broadcast program, controls are provided in the internal mode, that is, when the color TV signal from the video processor circuit 24 is selected, the system controller controls the switch 32 to select the TV sound signal or the independent sound signal from the D/A converter 26.

On the other hand, if the program being received is a high-definition broadcast program, controls are provided in the external mode. In particular, the system controller controls the AV switch 32 to select the color TV signal and sound signal from the MUSE down-converter 51. Specifically, the sound signal of an ordinary broadcast program is converted into a PCM sound signal. Also, the sound signal is PSK-modulated and multiplexed with the picture signal by frequency-division multiplexing. The sound signal from the high-definition program is converted into a PCM sound signal by the DPCM audio near-instantaneous compressing and expanding technique and time-division multiplexed during the vertical retrace periods of the video signal. As an example, if the tuned program is received well, that is, the reception level at the level detector circuit 27 is high, and if the PCM sound signal is synchronized by the PSK demodulator 25, then the system controller 41 determines that the present program is an ordinary broadcast program. In such case, the system controller 41 controls the selector switches 32a and 32c to select the color TV signal from the video processor circuit 24 and to select either the TV sound signal or the independent sound signal from the D/A converter 26. On the other hand, in the case of a high-definition broadcast program, the system controller 41 controls the selector switches 32a and 32c to select the color TV signal and the sound signal from the MUSE down-converter 51. The system controller 41 determines whether the present program is an ordinary broadcast program or a high-definition program based on the presence or absence of keyed AFC pulses supplied to the BS tuner 23 from the MUSE down-converter 51 via the external input terminal 28d.

The selected color TV signal is supplied to the video processor circuit 33, while the sound signal is sent to the audio processor circuit 37. As a result, the user can watch an ordinary broadcast program or a high-definition broadcast program simply by setting the desired channel, regardless of the kind of BS broadcast program, either an ordinary program or a high-definition broadcast program.

More specifically, today's high-definition broadcast programs share the same channel with ordinary broadcast programs but both kinds of programs are broadcast in different periods of time. For instance, the system controller determines whether the present program is an ordinary broadcast program or a high-definition broadcast program, depending on the presence or absence of the keyed AFC pulses, on the reception level at the level detector circuit, or on the PCM sound signal. If it is an ordinary broadcast program, the system controller 41 selects the color TV signal from the video processor circuit 24 and the sound signal from the D/A converter circuit 26. If it is a high-definition broadcast program, the system controller 41 provides a control so that the color TV signal and the sound signal are obtained by decoding using the MUSE down-converter 51 connected to the outside. This allows the user to watch an ordinary broadcast program or a high-definition broadcast program simply by setting the present program to the desired BS-23 channel, regardless of kind of the BS broadcast program.

If necessary, the user may operate the remote controller 60 to display the picture of a terrestrial broadcast program on the mini-viewing screen, while watching a BS broadcast program on the main screen, as described above. If so, the system controller 41 receives a control signal corresponding to this operation indicating a picture-in-picture display from the remote controller 60. The controller controls the VHF/UHF tuner 12 so as to be tuned to the signal of the selected channel of the terrestrial broadcast. Also, the system controller 41 controls the selector switch 32b to select the color TV signal from the VHF/UHF tuner 12, and the selected color TV signal is supplied to the picture-in-picture processing circuit 34. The picture-in-picture processing circuit 34 converts the color TV signal into three primary color signals, and supplies them as signals for the mini-viewing screen to the video processor circuit 33 via the RGB switch 35. Consequently, the user can watch the BS broadcast program on the main screen and the terrestrial broadcast program on the mini screen.

As another example, if the user sets the channel to the BS-3 channel by using the remote controller 60 in order to watch programs of a desired channel of the BS broadcast, or in order to listen to programs of the independent sound of a desired channel, the system controller 41 receives a control signal indicating the channel number from the remote controller 60, tunes the BS tuner 23 to the signal of the BS-3 channel, and senses whether the present program is a free, unscrambled broadcast program or a pay scrambled broadcast program based upon whether the PCM sound signal from the PSK demodulator 25 is scrambled or not. If the program is being broadcast as a free broadcast program, controls are provided in the internal mode, that is, the system controller controls the AV switch 32 to select the color TV signal from the video processor circuit 24 and to select the TV sound signal from the D/A converter 26. If the program is being broadcast as a pay broadcast program, controls are provided in the external mode, that is, the AV switch 32 is controlled so that the color TV signal and the TV sound signal from the JSB decoder 52 are selected. When the user listens to a music program or the like broadcast as an independent sound program, if the TV sound signal is scrambled according to the scrambling of the TV sound signal, controls are provided in the external mode. That is, the system controller 41 provides control of the AV switch 32 to select the descrambled color TV signal and the independent sound signal from the JSB decoder 52. If the TV sound signal is not scrambled, controls are provided in the internal mode. That is, the system controller 41 controls the AV switch 32 to select the color TV signal from the video processor circuit 24 and the independent sound signal from the D/A converter 26. The color TV signal selected by the AV switch 32 is supplied to the video processor circuit 33, whereas the sound signal is fed to the audio processor circuit 37.

Typically, the sound signal of a free broadcast program is converted into a PCM sound signal, PSK-modulated, and multiplexed with the picture signal by frequency-division multiplexing. On the other hand, the sound signal of a pay broadcast program is typically converted into a PCM sound signal, then scrambled, PSK-modulated, and multiplexed with the picture signal by frequency-division multiplexing. The system controller 41 determines whether the present program is a pay broadcast program or a free broadcast program according to the eighth bit of a range of bits indicating whether the PCM sound signal detected by the PSK demodulator 25 is scrambled or not. Four combinations exist for pay broadcast programs and free broadcast programs: TV sound signal (agreeing with the TV signal) not scrambled; scrambled TV sound signal; sound signal not scrambled; and scrambled independent sound signal. In the TV sound mode in which the TV sound is selected, either the internal mode or the external mode is automatically selected, depending on whether the TV sound signal is scrambled or not. If the TV sound is not scrambled, the internal mode is automatically selected, whereas if it is scrambled, the external mode is automatically selected. As a result, the user can watch both scrambled pay broadcast programs and free broadcast programs not scrambled without the need to switch between the internal mode and the external mode.

In the independent sound mode in which an independent sound signal is selected, either the external mode or the internal mode is automatically selected, depending on whether the independent sound signal is scrambled or not and on whether the TV sound signal is scrambled or not. If the independent sound signal is scrambled, the external mode is automatically selected, whereas if the independent sound signal is not scrambled, and if the TV sound signal is scrambled, then the external mode is selected. If the TV sound signal is not scrambled, the internal mode is automatically selected. As a result, the user can listen to a music program or the like broadcast as scrambled independent sound signals, or broadcast as pay programs. Also, the user can listen to music programs or the like broadcast as independent sound signals that are not scrambled, or a free program, while the picture is being normally displayed, regardless of whether the picture signal is scrambled or not. At this time, if the sound signal is not scrambled, or if the picture signal is scrambled but the picture blank mode is established, the internal mode is automatically selected. Deterioration in the sound quality is prevented, because the sound signal is supplied without going through the JSB decoder 52 or other devices. The system controller 41 may also sense whether the present program is a pay broadcast program or a free broadcast program according to the twelfth bit of a range of control bits of the PCM sound signal indicating whether the picture signal is scrambled or not.

Then, if the user sets the channel to a CS broadcast by using the remote controller 60 to listen to music programs or the like of the desired channel of the CS broadcast, the system controller 41 receives a control signal indicating the channel number from the remote controller 60, controls the BS tuner 23 so as to be tuned to the signal of the established channel, and senses whether the present music program or the like is a free broadcast program that is not scrambled or a pay broadcast program that is scrambled, based on whether the PCM sound signal from the PSK demodulator 25 is detected to have been scrambled or not. If the present program is a free broadcast program, then the system controller 41 controls the AV Switch 32 to select the sound signal from the D/A converter 26. On the other hand, if the present program is a pay broadcast program, the system controller controls the AV switch 32 to select the sound signal from the CS decoder 53.

As described above, the sound signal of a free broadcast program is converted into a PCM sound signal, PSK-modulated, and multiplexed by frequency-division multiplexing techniques. The sound signal of a pay broadcast program is converted into a PCM sound signal, then scrambled, PSK-modulated, and multiplexed by frequency-division multiplexing techniques. The system controller 41 determines whether the present program is a pay broadcast program or a free broadcast program according to the eighth bit of a range of bits indicating whether the PCM signal detected by the PSK demodulator 25 is scrambled or not. If the present program is a free broadcast program, the system controller 41 controls the selector switch 32c so as to select the sound signal from the D/A converter 26. If the program is a pay broadcast program, the controller controls the selector switch 32c so as to select the sound signal from the CS decoder 53.

The selected sound signal is supplied to the audio processor circuit 37. The result is that the user can listen to music either of a free broadcast program or of a pay broadcast program simply by setting the channel to the desired channel, regardless of whether the broadcast program is a free or a pay program.

The television receiver of the present invention has the above-described functions of automatically switching between the internal mode and the external mode. In addition, the user can manually switch the mode, using the remote controller 60, for example.

This television receiver has various functions including the picture-in-picture display function, BS broadcast reception function, and channel-locking function during recording. The receiver displays the menu of items that are set according to the various functions to permit the user to sufficiently and easily exploit these functions. The user can easily set various items by the use of the cursor controls 62, 63 and the decision switch 64 on the remote controller 60 while watching the menu.

Figure 3A:
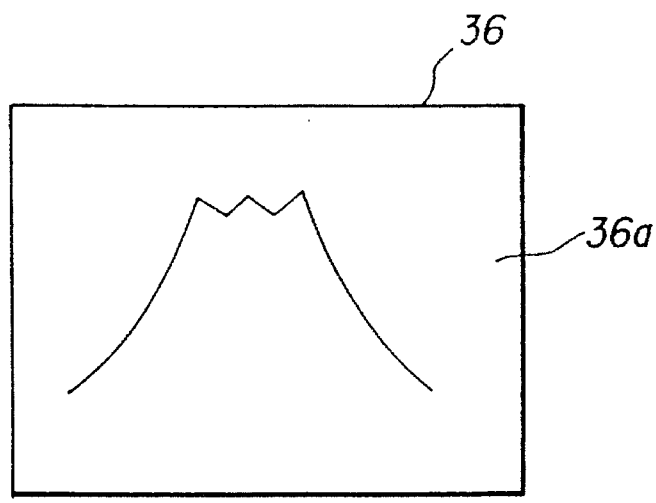
FIGS. 3a, 3b, and 3c are pictorial representations of images displayed on the television receiver of FIG. 1.
Figure 3B:
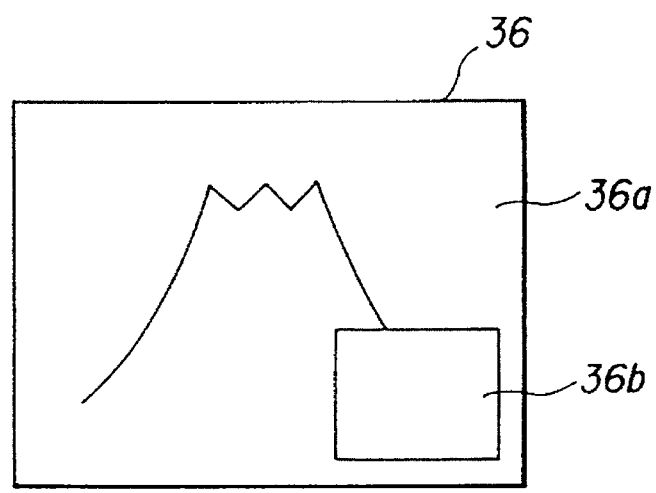
Figure 4:
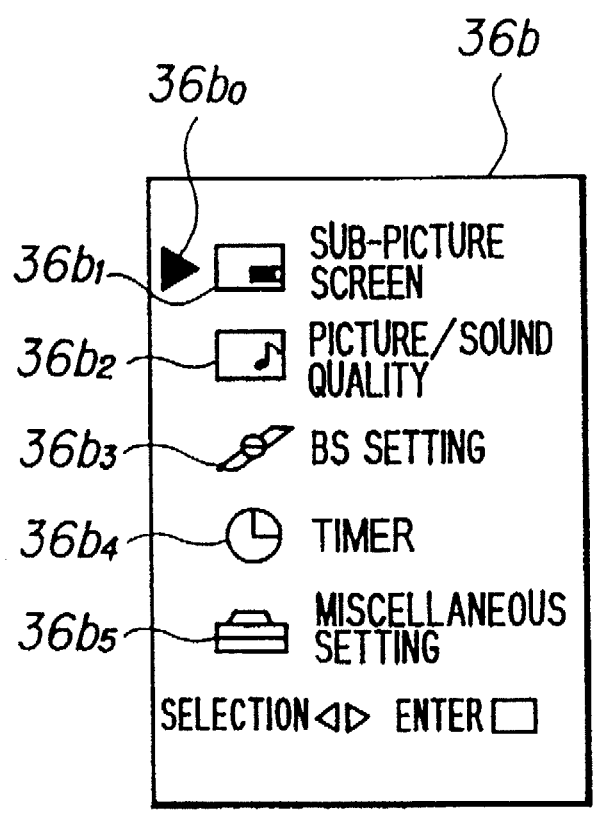
FIG. 4 is an example of a main menu displayed by the television receiver.

More specifically, if the user depresses the menu switch 61 on the remote controller 60, the system controller 41 receives the control signal supplied from the remote controller 60 via the reception circuit 47 and produces a control signal to display items according to the main menu. The system controller 41 sends character data for display of the main menu previously stored in the memory 42 to the display microcomputer 45 via the I²C bus. The display microcomputer 45 provides a control according to this data to display the main menu on the mini-viewing screen 36b that is a part of the main viewing screen 36a of the CRT 36, as shown in FIG. 3b. The microcomputer 45 displays the main menu together with a cursor $36b_o$, as shown in FIG. 4. The main menu consists of an item $36b_1$ relating to the mini-viewing screen in a picture-in-picture display, an item $36b_2$ relating to the image quality and sound quality, an item $36b_3$ relating to switching the reproduced sound in a BS broadcast, an item $36b_4$ relating to the timer for making reservations for recording, and an item $36b_5$ relating to setting the parameters of the various functions, such as switching of reproduced duplex sound.

More specifically, by moving the cursor $36b_o$ to item $36b_5$, the display microcomputer 45 supplies three primary color signals for display to the video processor circuit 33. The video processor circuit 33 converts the color TV signal from the selector switch 32a of the AV switch 32 into three primary color signals as described above, and switches between these primary color signals and the primary color signals from the RGB switch 35 on a time-division basis to display the picture according to the color TV signal from the selector switch 32a on the main viewing screen 36a shown in FIG. 3b and to display the picture according to the three primary color signals from the RGB switch 35 on the mini-viewing screen 36b.

The user then depresses the cursor switches 62 or 63 on the remote controller 60 to move the cursor $36b_o$ into the position of the desired set item while watching the main menu displayed as described above. The set item at the position of the cursor $36b_o$ is selected by depressing the decision switch 64. Then, a new menu corresponding to the selected set item is displayed. The movement of the cursor $36b_o$ and the display of the new menu corresponding to the selected set item, for example, are carried out under the control of the system controller 41 in the same way as described hereinabove. That is, the system controller 41 reads data about the new menu from the memory 42 in response to the control signal from the remote controller 60 and sends the data to the display microcomputer 45, which then controls the display provided on the mini-viewing screen 36b according to the data.

Figure 3C:
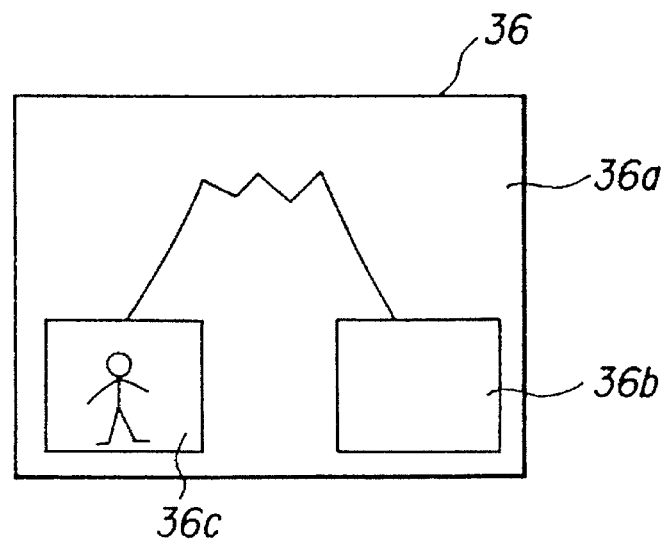
Figure 5A:
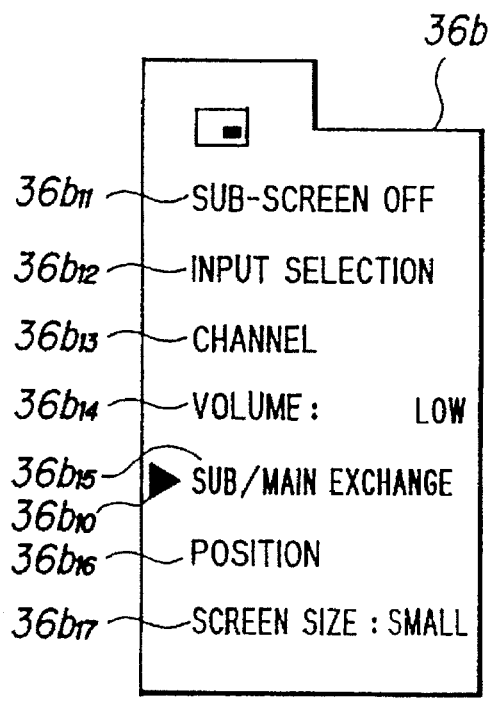
FIGS. 5a, 5b, and 5c are images of the mini viewing screen menu.

A specific example of the new menu corresponding to the various set items is described below. If the mini-viewing screen item $36b_1$ is selected on the main menu, two mini-viewing screens 36b and 36c are simultaneously displayed on opposite sides of a lower portion of the main viewing screen 36a, as shown in FIG. 3c. A color TV signal from one of the video processor circuit 24 or the VTR 70 is selected by the selector switch 32b of the AB switch 32. The picture corresponding to the selected color TV signal is then displayed on the mini-viewing screen 36c. FIG. 5a shows a mini-viewing screen menu displayed together with a cursor $36b_{10}$ on the mini-viewing screen 36b. This mini viewing screen menu includes an item $36b_{11}$ related to blanking out the mini-viewing screen 36c and returning the display provided on the mini-viewing screen 36b to the main menu, an item $36b_{12}$ relating to setting the source of the color TV signal for displaying the picture on the mini-viewing screen 36c, an item $36b_{13}$ relating to setting the channel of the source, an item $36b_{14}$ relating to adjusting the volume of the sound produced corresponding to the picture displayed on the mini-viewing screen 36c, an item $36b_{15}$ relating to main/mini interchanging for interchanging the picture on the main viewing screen 36a and the picture on the mini-viewing screen 36c, an item $36b_{16}$ relating to setting the position of the mini-viewing screen 36c within the main viewing screen 36a, and an item $36b_{17}$ relating to setting the size of the mini-viewing screen 36c.

Thus, the user selects the mini-viewing screen set items $36b_1$ on the main menu and the display on the mini-viewing screen 36b is changed to the mini-viewing screen menu, as shown in FIG. 5a, for example. At the same time, the picture in the previously set condition is displayed on the mini-viewing screen 36c. The user can set the channel of the mini-viewing screen 36c or perform other operations, while watching the picture displayed on the mini-viewing screen 36c. The time taken to display the mini-viewing screen 36c can be shortened compared with the prior art apparatus, so that operability is enhanced.

The user selects desired items to be set using the cursor switches 62, 63 and the decision switch 64 on the remote controller 60, in the same way as when the main menu is displayed, while watching the mini-viewing screen menu as it is displayed on the mini-viewing screen 36b. For example, if the user selects the main/mini interchanging item $36b_{15}$, the system controller 41 controls the AV switch 32 to interchange the picture displayed on the main viewing screen 36a with the picture displayed on the mini-viewing screen 36c before the depression of the decision switch 64, and stores the present set condition, which in this case is the channel number of the picture displayed on the mini-viewing screen 36c, in the memory 42. As a result, the picture on the main viewing screen 36a and the picture on the mini-viewing screen 36c are interchanged.

Figure 5B:
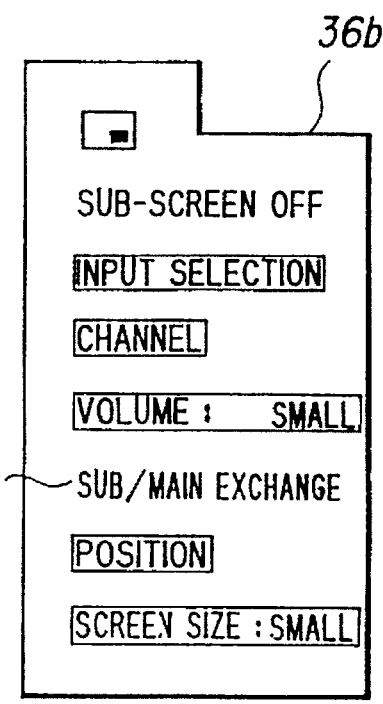

As represented by the outlined lettering in FIG. 5b, the system controller 41 supplies data to the display microcomputer 45 via the $I^2C$ bus to roughly halve the brightness of those items other than the selected item, which in this example is the main/mini interchanging item $36b_{15}$, to permit the user to check the operation and to confirm that the picture on the main viewing screen 36a and the picture on the mini-viewing screen 36c have been interchanged. The display microcomputer 45 reduces the three primary color signal levels regarding the set items other than the main/mini interchanging item $36b_{15}$ supplied to the video processor circuit 33 via the RGB switch 35 in response to the data.

Figure 6:
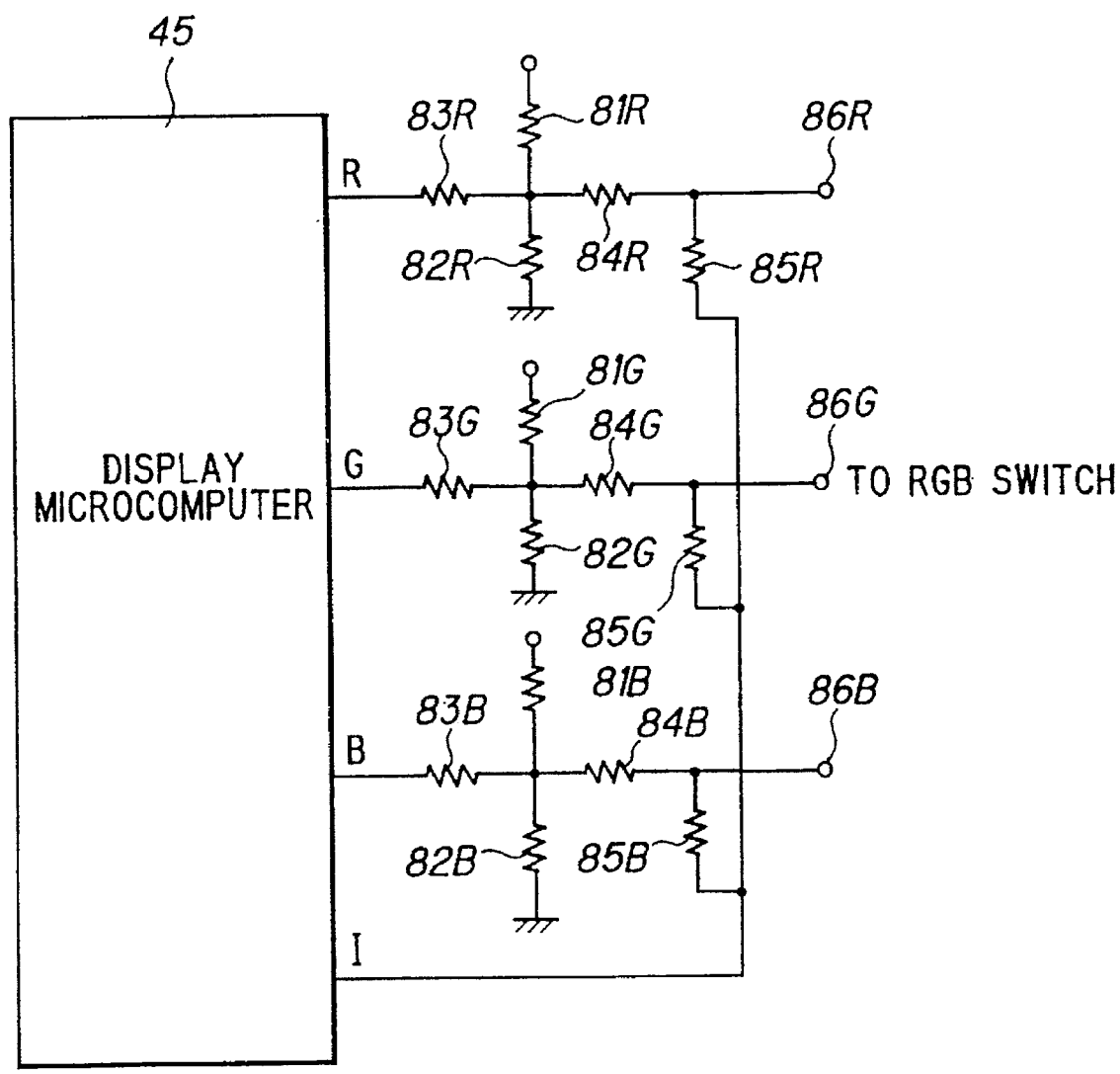
FIG. 6 is a schematic of a circuit that renders set items halftone during display.

FIG. 6 shows an output circuit for the display microcomputer 45 comprising resistors $81_R$, $81_R$ for DC bias, resistors $83_R$, $84_R$ for output impedance, and a resistor $85_R$ for varying the output level of the red (R) signal from the display microcomputer 45. This circuit can vary the level of the R signal at the output terminal $86_R$ based upon the state of signal I from the display microcomputer 45. Resistors $81_R$ and $82_R$ are connected between a power supply (not shown) and ground, and resistors $83_R$ and $84_R$ are connected in series between the R signal output terminal of the display microcomputer 45 and an output terminal $86_R$. The junction of the resistors $83_R$ and $84e$ is connected with the junction of the resistors $81_R$ and $82_R$. The resistor $85_R$ is connected between the I signal output terminal of the display microcomputer 45 and the output terminal $86_R$, and when a halftone item is to be displayed the display microcomputer 45 changes the level of the I signal, which is normally at level 1 or high impedance, to 0. In this way, the level of the R signal supplied to the RGB switch 35 via the output terminal $86_R$ is decreased.

A similar circuit for the green signal (G) is provided comprising resistors $81_G$, $82_G$ for DC bias, resistors $83_G$, $84_G$ for output impedance, and a resistor $85_G$ for varying the output level connected to the G signal output terminal of the display microcomputer 45. This circuit can vary the G signal level based on the level of signal I. A circuit comprising resistors $81_B$, $82_B$ for the DC bias, resistors $83_B$, $84_B$ for output impedance, and a resistor $85_B$ for varying the output level is connected to the blue (B) signal output terminal of the display microcomputer 45 as in the case of the R signal. This circuit can vary the B signal level based on the level of signal I. Thus, when a halftone item is to be displayed, the levels of the G and B signals supplied to the RGB switch 35 via the output terminals $86_G$ and $86_B$, respectively, are reduced. The display microcomputer 45 controls the level of the I signal to 1 at the instant when the main/mini interchanging item $36b_{15}$ is displayed and to 0 when other items are displayed. Consequently, the levels of the three primary color signals for set items other than the main/mini interchanging item $36b_{15}$ are reduced.

The three primary color signals whose levels are controlled in this way are fed to the video processor circuit 33 from switch 35. As a result, set items other than the main/mini interchanging item $36b_{15}$ are displayed as halftone items, so that the user can confirm the selected set items.

Figure 5C:
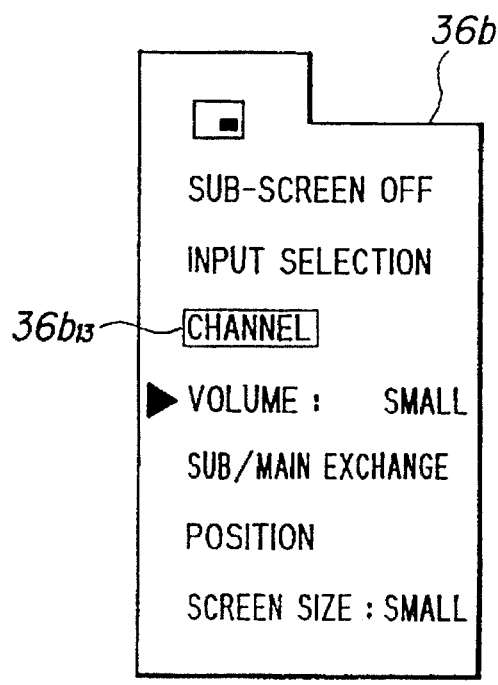

As an example, in this mini-viewing screen menu if the source for displaying the picture on the mini-viewing screen 36c at the input selector item $36b_{12}$ is selected as the VTR 70, it is impossible to change the channel of the mini-viewing screen 36c, because no channel is available on reproduction of the VTR 70. As shown in FIG. 5c, after the source is set to the VTR 70 at the input selector item $36b_{12}$, the displayed channel item $36b_{13}$ is made halftone, thus informing the user that this set item cannot be selected. In other words, the inhibited item that cannot be selected under the present set conditions is presented as a halftone. If data about the viewing screen corresponding to the mini-viewing screen menu not having the channel item $36b_{13}$ has been previously stored in the memory 42, and if the source is set to the VTR 70, then it may be considered that the picture according to the picture data is displayed on the mini-viewing screen 36b, however, it is not necessary to store the data about this new picture, since the inhibited items are displayed in the form of halftone items as described above. Thus, plural states share one frame of image, and it is possible to reduce the capacity of the memory 42.

Figure 7:
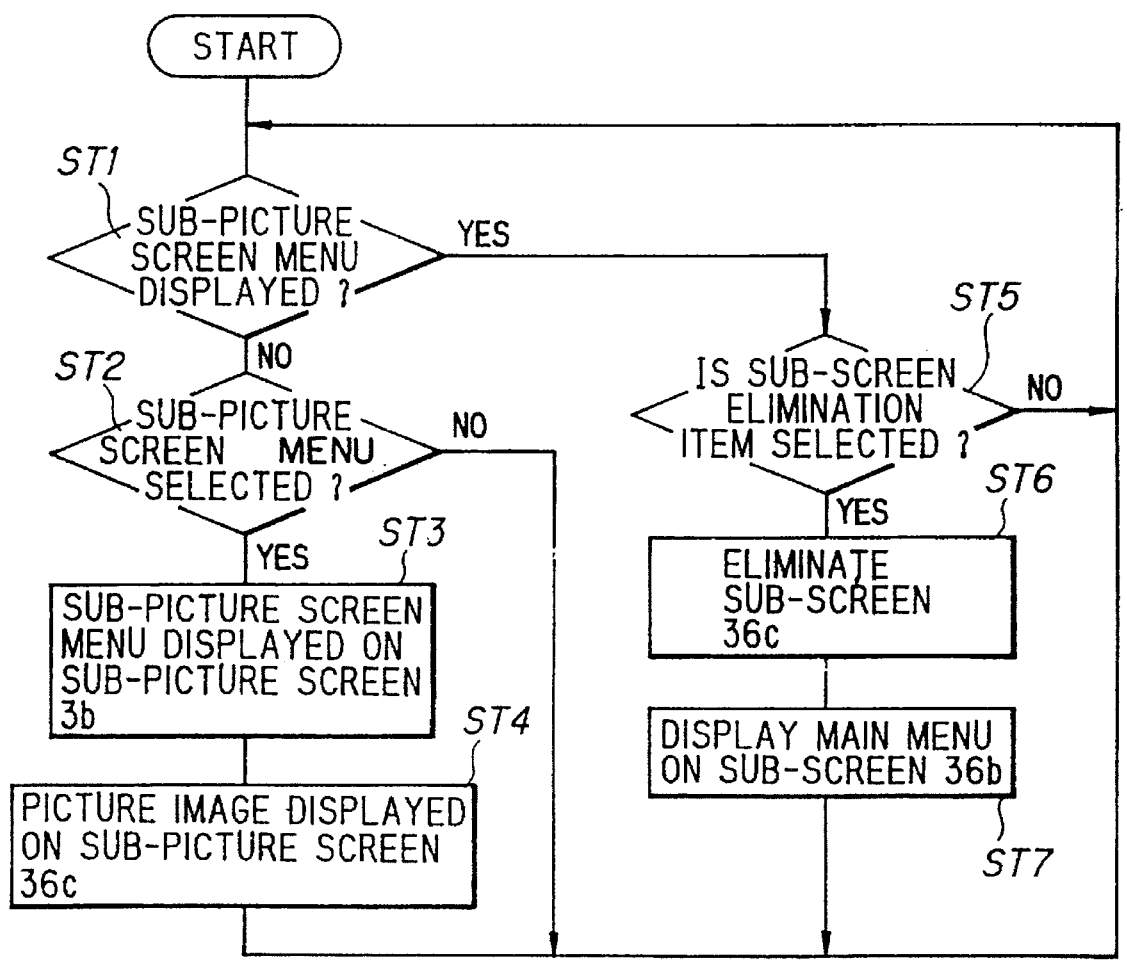
FIG. 7 is a flowchart illustrating a method for controlling the display on the mini-viewing screen.

The television receiver can shift from the above-described main menu display to the mini-viewing screen menu display or vice versa in the manner described below. As illustrated in the flowchart of FIG. 7, at step ST1 the system controller 41 makes a decision as to whether the mini-viewing screen menu is displayed on the mini-viewing screen 36b. If not, then the main menu is being displayed and control goes to step ST2. If the mini-viewing screen is being displayed, then control proceeds to step ST5.

In step ST2, the system controller 41 determines whether the mini-viewing screen item $36b_1$ has been selected in the main menu and, if Yes, control goes to step ST3. If No, control goes back to step ST1, that is, the system controller waits in the loop from step ST1 to step ST2 until the mini-viewing screen item $36b_1$ is selected from the main menu.

In step ST3, the system controller 41 controls the display microcomputer 45 to display the mini-viewing screen menu on the mini-viewing screen 36b, then control goes to step ST4.

In step ST4, the system controller 41 selects a color TV signal from one of the VTR 70, the VHF/UHF tuner 12, or other source under the same conditions as when the previous operation was performed to display the mini-viewing screen. The controller 41 controls the AV switch 32 to supply the selected color TV signal to the picture-in-picture processing circuit 34, and returns to step ST1. If the mini-viewing screen item $36b_1$ is selected in the main menu, the mini-viewing screen menu is displayed on the mini-viewing screen 36b and, at the same time, the picture is displayed on the mini-viewing screen 36c.

In step ST5, the system controller 41 makes a decision whether the mini-viewing screen blanking item $36b_{11}$ in the mini-viewing screen menu has been selected. If Yes, the controller proceeds to step ST6 and, if No, the controller goes back to step ST1.

In step ST6, the system controller 41 controls the picture-in-picture processing circuit 34 so as to blank out the mini-viewing screen 36c and then the method proceeds to step ST7.

In step ST7, the system controller 41 replaces the mini-viewing screen menu displayed on the mini-viewing screen 36b by the display of the main menu and returns to step ST1. If the mini-viewing screen blanking item $36b_{11}$ is selected while the mini-viewing screen is being displayed, the system controller 41 blanks out the mini-viewing screen 36c and controls the picture-in-picture processing circuit 34 to change the display of the mini-viewing screen 36b to the display of the main menu. In this way, the main menu and the mini viewing screen menu are interchanged.

If the BS set item $36b_3$ in the main menu shown in FIG. 4 is selected, a BS set menu shown in FIG. 8a is displayed on the mini-viewing screen 36b along with a cursor $36b_{30}$. BS set menu comprises an item $36b_{31}$ relating to returning to the main menu, an item $36b_{37}$ relating to switching between the TV sound signal and the independent sound signal, an item $36b_{33}$ relating to channel-locking for locking the channel to prevent inadvertent change of the channel during recording, an item $36b_{34}$ relating to BS easy recording and volume for producing a color TV signal and a sound signal corresponding to the presently viewed picture from the VTR 70, an item $36b_{35}$ relating to blanking for blanking out the picture when the user is listening to the independent sound or the program is being recorded, an item $36b_{36}$ relating to antenna level for displaying the reception level at the BS antenna 21, and an item $36b_{37}$ relating to the decoder input selector for automatically or manually switching between the color TV signals from the MUSE downconverter 51, the JSB decoder 52, and the like.

In the same way as in the case of the above-described mini-viewing screen menu, the user selects desired set items using the cursor switches 62, 63 and the decision switch 64 on the remote controller 60, while watching the BS set menu displayed on the mini-viewing screen 36b. For example, the user moves the cursor $36b_{30}$ to the sound selection item $36b_{32}$ and then presses the decision switch 64. The display microcomputer 45 provides a control so that set items other than the selected sound selection item $36b_{32}$ are displayed as halftone items. The system controller 41 controls the PSK demodulator 25 and other circuits to switch the sound produced at loudspeaker 38 from the TV sound to the independent sound or vice versa. As a result, the TV sound and the independent sound can be interchanged.

Inhibited items in the BS set menu are the sound selection item $36b_{32}$, which is set when the presently viewed program is a terrestrial broadcast program or a program in the B mode, the antenna level item $36b_{36}$, which is set except on BS broadcasting, and the decoder input selection item $36b_{37}$. When the present program is a broadcast program in the B mode, for example, the display microcomputer 45 provides a control so that the sound selection item $36b_{32}$ is displayed as a halftone item, as shown by the dotted background in FIG. 8b.

If the timer item $36b_4$ in the main menu of FIG. 4 is selected, a timer menu is displayed on the mini-viewing screen 36b together with a cursor $36b_{40}$, as shown in FIG. 9a. The timer menu comprises an item $36b_{41}$ relating to returning to the main menu, an item $36b_{42}$ relating to sleep for turning off the power supply after a given time elapses, an item $36b_{43}$ relating to BS recording reservation for setting various parameters such as the starting time of recording when a reservation is made for recording of a BS broadcast program, an item $36b_{44}$ relating to executing the recording reserved at the BS recording reservation set item $36b_{43}$, an item $36b_{45}$ relating to program reservation for setting various parameters for recording a terrestrial broadcast, an item $36b_{46}$ relating to program reservation for executing the recording reserved at the program reservation set item $36b_{45}$, an item $36b_{47}$ relating to time set for setting the time, and an item $36b_{48}$ relating to time display for displaying the time.

The user selects the desired item by using the cursor switches 62, 63 and the decision switch 64 on the remote controller 60, while watching the timer menu displayed on the mini-viewing screen 36b, in the same way as in the case of the mini-viewing screen menu described above. For example, if the cursor $36b_{40}$ is moved to the sleep item $36b_{42}$ and the decision switch 64 is depressed, the display microcomputer 45 provides a control so that set items other than the selected sleep item $36b_{42}$ are displayed as halftone items. The system controller 41 then begins to measure time and turns off the power supply after the lapse of a predetermined time.

Inhibited items in this timer menu are the BS recording reservation item $36b_{44}$ when the various parameters such as the recording starting time and the channel number are not set or entered in spite of the BS recording reservation set item $36b_{44}$, and the program reservation item $36b_{46}$ when the various parameters are not entered in spite of the program reservation set item $36b_{45}$. For example, when the various parameters corresponding to the program reservation set item $36b_{45}$ are not entered, the display microcomputer 45 provides a control so that the program reservation item $36b_{46}$ is displayed as a halftone item, as shown in FIG. 9b.

Figure 10A:
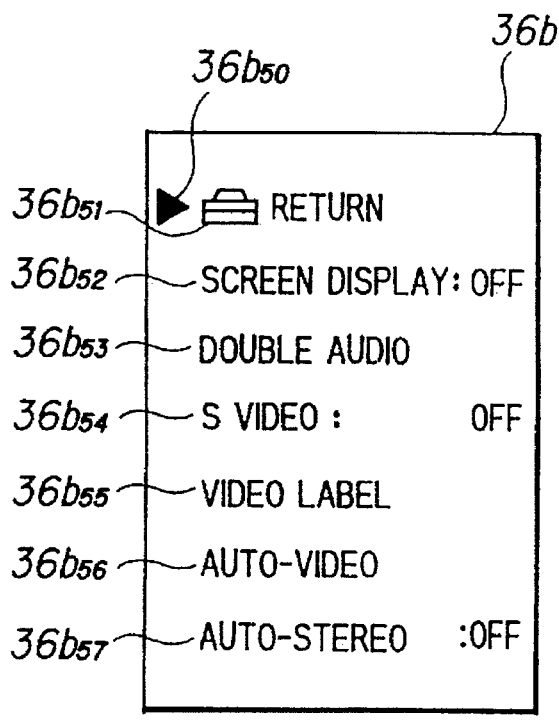
FIG. 10a and 10b are images corresponding to an example of a various parameters set menu.

Then, if the various settings item $36b_5$ in the main menu of FIG. 4 is selected, various settings menu 1 and various setting menu 2 are alternatively displayed on the mini-viewing screen 36b. As shown in FIG. 10a, various setting menu 1 is displayed together with a cursor $36b_{50}$, and comprises an item $36b_{51}$ relating to returning to the main menu, an item $36b_{52}$ relating to the viewing screen display for providing and blanking the display of picture by superimposition of the channel number as described above, an item $36b_{53}$ relating to duplex sound for switching between the main sound and the auxiliary sound of a duplex sound broadcast, an item $36b_{54}$ relating to the S picture for entering the so-called S picture signal, an item $36b_{55}$ relating to the video label for setting a so-called video label, an item $36b_{56}$ relating to auto-video for setting a so-called automatic video, and an item $36b_{57}$ relating to auto-stereo for automatically setting the stereophonic mode when a stereophonic program is broadcast.

The user then selects the desired set item using the cursor switches 62, 63 and the decision switch 64 on the remote controller 60, while watching the various settings menu 1 displayed on the mini-viewing screen 36b, in the same way as in the case of the mini-viewing screen menu described above. For example, if the cursor $36b_{50}$ is moved to the duplex sound item $36b_{53}$ and the decision switch 64 is pressed, the display microcomputer 45 provides a control so that set items other than the selected duplex sound item $36b_{53}$ are made halftone. The system controller 41 controls the audio processor circuit 37 and other circuits so that the set main sound or auxiliary sound is produced at the loudspeaker 38.

Figure 10B:
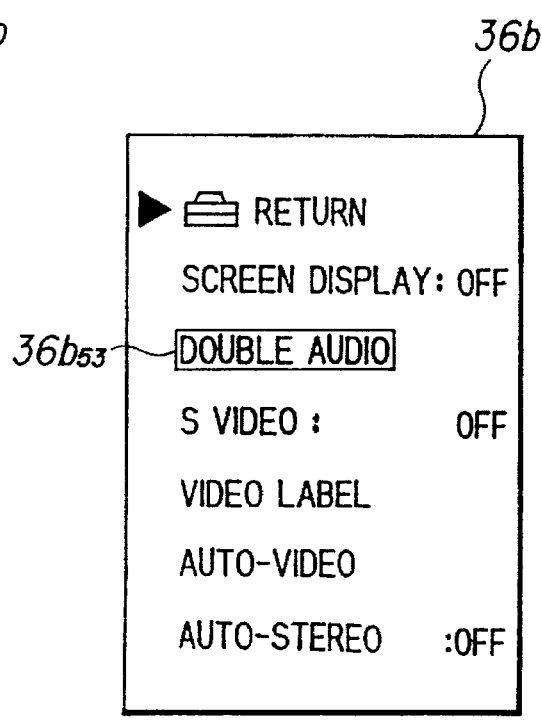

Inhibited items in this various settings menu 1 are the duplex sound item $36b_{53}$, except for the cases of video input and duplex sound broadcasts, the S picture item $36b_{54}$ in the TV mode in which sound according to the sound signal from the incorporated VHF/UHF tuner 12 is produced from the loudspeaker 38, and the auto stereo item $36b_{57}$, except when a stereophonic program is being broadcast. As an example, when the color TV signal from the VTR 70 is entered, the display microcomputer 45 provides a control so that the displayed duplex sound item $36b_{53}$ is made halftone, as shown by the dotted background in FIG. 10b.

Figure 11A:
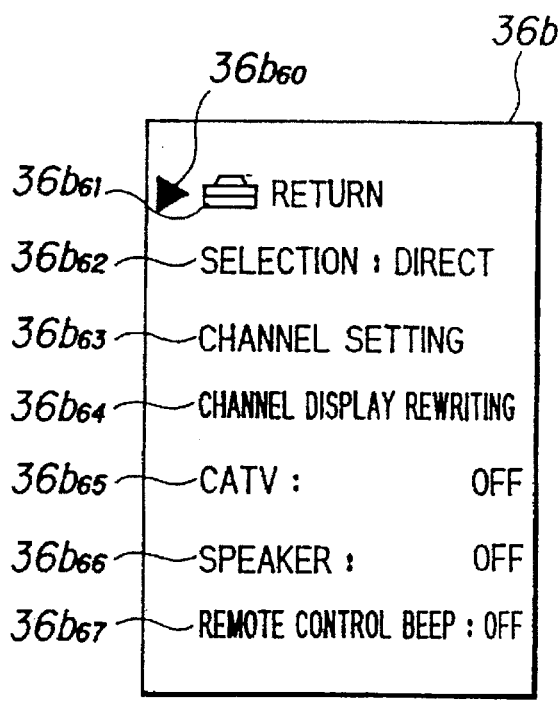
FIG. 11a and 11b are images corresponding to an example of another various parameters set menu.

As shown in FIG. 11a, the various settings menu 2 is displayed along with a cursor $36b_{60}$ and comprises an item $36b_{61}$ relating to returning to the main menu, an item $36b_{62}$ relating to channel selection for setting the method of channel selection, such as direct channel selection, an item $36b_{61}$ relating to the channel set for setting the channel, an item $36b_{64}$ relating to the channel display rewrite for rewriting the display of the channel, an item $36b_{65}$ relating to CATV for entering a CATV program, an item $36b_{66}$ relating to for stopping production of sound from the loudspeaker 38, and an item $36b_{67}$ relating to the remote controller sound for switching on or off the sound from loudspeaker 38 confirming the operation of the remote controller 60 when it is operated.

The user then selects the desired set item using the cursor switches 62, 63 and the decision switch 64 on the remote controller 60, while watching the various settings menu 2 displayed on the mini-viewing screen 36b, in the same way as in the case of the mini-viewing screen menu described above. For example, if the cursor $36b_{60}$ is moved to the remote controller sound item $36b_{67}$, and if the decision switch 64 is depressed to turn off the sound, then the display microcomputer 45 provides a control so that set items other than the remote controller sound item $36b_{67}$ are displayed as halftone items. The system controller 41 controls the audio processor circuit 37 and other circuits to prevent production of sound confirming the operation of the loudspeaker 38.

Figure 11B:
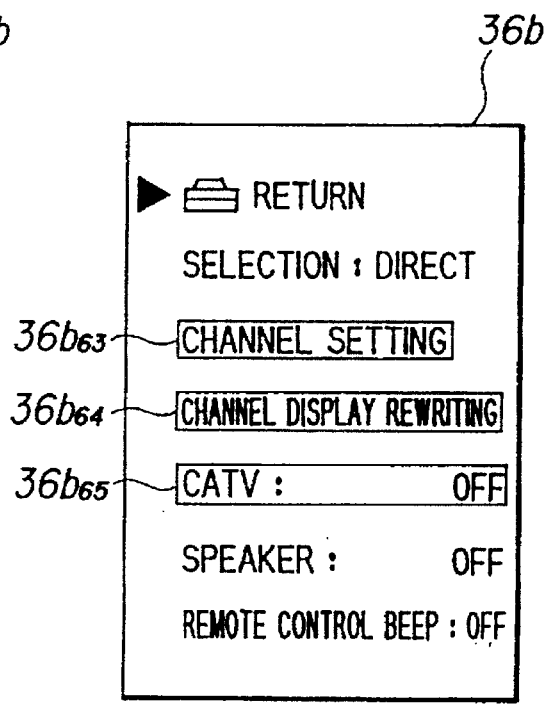

Inhibited items in this various settings menu 2 are the channel set item $36b_{63}$ in the case of video input, the channel display rewrite item $36b_{64}$, and the CATV item $36b_{65}$ at the time of reception of a BS broadcast or input of video. As an example, when the color TV signal from the VTR 70 is being entered, the display microcomputer 45 provides a control so that items beginning with the channel set item $36b_{63}$ and ending with the CATV item $36b_{65}$ are displayed as halftone items, as shown by the dotted background in FIG. 11b.

In this way, set items for the incorporated functions are displayed in the form of menus to permit the user to sufficiently and easily use the various functions. Set items other than the selected items are made halftone to facilitate checking them. Depending on the usage, some of the displayed set items are inhibited. These inhibited items are made halftone. Hence, the number of the menus can be reduced, thereby reducing the capacity of the memory 42. Depending on the conditions of use, if the mode of operation is changed, previously set items or values may be inhibited later and the system provided by the present invention can cope with this situation.

More specifically, the menu key 61 on the remote controller 60 of FIG. 2 is depressed to display the above-described main menu, shown in FIG. 4. Then, the various settings item $36b_5$ is selected using the cursor switches 62, 63 and the decision switch 64, to display the various settings menu 1 shown in FIG. 10a. Subsequently, the duplex sound item $36b_{53}$ in the various settings menu 1 is selected. If the output sound is set to the main sound, set items other than the duplex sound item $36b_{53}$ are made halftone, with the result that the main sound is generated from the loudspeaker 38. Under this condition, if the video input key 66 on the remote controller 60 is depressed to set the source of the color TV signal applied to this television receiver to the VTR 70, that is, if the mode of operation is set to the video input mode, the duplex sound item $36b_{S3}$ is inhibited, because duplex sound does not exist in this video input mode.

Accordingly, this television receiver returns the display on the mini-viewing screen 36b to the condition prior to the selection of the duplex sound item $36b_{S3}$, in which the various settings menu 1 was displayed. Also, the displayed duplex sound item $36b_{S3}$ is made halftone, thus, informing the user that item is inhibited from selection. As a result, if the color TV signal from the VTR 70 is input and the picture according to this color TV signal is being displayed, the operation for setting the duplex sound item $36b_{S3}$ is inhibited. In the prior art apparatus, if the reproduced sound of the duplex sound is switched to the other one erroneously, while the user is watching the picture reproduced by the VTR, then the set value stored in the memory 42, relating to the duplex sound will be switched. In the apparatus according to the present invention, this switching can be prevented.

In this embodiment of television receiver the menu key 61 on the remote controller 60 of FIG. 2 is pressed to display the main menu, which is shown in FIG. 4. The various settings item $36b_5$ is then selected to display the various settings menu 1 shown in FIG. 10a. Thereafter, the duplex sound item $36b_{S3}$ in the various settings menu 1 is selected to set the produced sound to the main sound, for example, and the main sound is produced from the loudspeaker 38. Under this condition, if the video input key 66 on the remote controller 60 is pressed to set the source of the color TV signal applied to this television receiver to the VTR 70, that is, if the mode of operation is set to the video input mode, the duplex sound item $36b_{S3}$ is inhibited, because duplex sound does not exist in this video input mode. The television receiver then returns the display of the mini-viewing screen item $36b_1$ to the condition in which it was prior to the selection of the duplex sound item $36b_{S3}$, that is, to the condition in which the various settings menu 1 is displayed. Also, the displayed duplex sound item $36b_{S3}$ is made halftone, thereby informing the user that the selected item is inhibited. As a result, if the color TV signal from the VTR 70 is input and the picture according to this color TV signal is being displayed, the operation for setting of the duplex sound item $36b_{S3}$ is inhibited. In the prior art apparatus, if the reproduced sound of the duplex sound is switched to the other one erroneously, while the user is watching the picture reproduced by the VTR, then the set value stored in the memory 42 relating to the duplex sound will be switched. In the apparatus according to the present invention, this switching can be prevented. Hence, operability can be improved.

As will be understood from the above description, in the television receiver of the present invention operating in plural modes, plural settings including items inhibited in these modes of operation are displayed on the display portion, which also provides a display of the picture. When some of the displayed set items are selected to set values, if the mode of operation is modified and at least one of the set items is inhibited in the new mode of operation, the setting mens is controlled so that this inhibited item is replaced by the condition prior to the setting. In this way, the user is informed of the inhibited set item. For example, in the video input mode, the operation for switching the reproduced sound to the duplex sound is inhibited. In the prior art apparatus, if the reproduced sound of the duplex sound is erroneously switched, then the set value about the duplex sound will be changed. In the inventive apparatus, this can be prevented. Hence, the operability can be improved.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. A television receiver operable in a plurality of modes of operation including reproduction of signals from different video and audio sources, the television receiver comprising:

display means including a display screen for displaying on a portion thereof a main menu having a plurality of displayed menu items for selection of respective operational parameters including a mode of operation by a user of the television receiver and a cursor for indicating a chosen menu item from the plurality of displayed menu items for selection, the plurality of displayed menu items including inhibited menu items that cannot be selected;

setting means for selecting the chosen menu item from the plurality of menu items displayed by the display means and for determining and setting values thereof, the setting means including a remote control unit having a plurality of manually operable keys for controlling movement of the cursor to a position adjacent to the chosen menu item from the plurality of displayed menu items for selection, for selecting the chosen menu item from the plurality of displayed menu items at the position adjacent to the cursor, and for setting values thereof;

control means for issuing an inhibit command to control the display means to indicate on the display screen that a displayed menu item is inhibited from selection when a present first mode of operation is changed to a second mode of operation and the displayed menu item is inconsistent with the second mode of operation, and for returning the inhibited menu item to its original uninhibited condition when the second mode of operation is changed to the first mode of operation or a third mode of operation with which the uninhibited menu item is consistent, the control means having memory means for storing a set value of the uninhibited menu item when the first mode of operation is changed to the second mode of operation, the control means retrieving the stored value and resetting the displayed menu item to the stored value when the first mode of operation is restored; and the display means further including a display microcomputer for generating a control signal in response to the inhibit command from the control means and for generating output signals corresponding to a red signal, a green signal and a blue signal, and a resistor network connected to the display microcomputer for lowering a signal level of the red, green and blue signals in response to the control signal in order to reduce a brightness of the inhibited menu item, wherein the user can visually confirm the selection of a menu item, and is prevented from selecting menu items that are not compatible with a selected video and audio source.

2. A television receiver according to claim 1, wherein each of the menu items of the main menu has a corresponding sub-menu having a plurality of sub-menu items selectable by the setting means, including predetermined inhibited sub-menu items, and upon selecting predetermined ones of the plurality of sub-menu items the control means controls the display means to reduce the brightness of the predetermined inhibited sub-menu items.

3. A television receiver according to claim 2, wherein the display means further comprises:

- a RGB switch for receiving the red, green, and blue signals produced by the display microcomputer after being passed through the resistor network and for switching signals corresponding to the main menu and the sub menu in response thereto;
- a video processing circuit for processing signals output from the RGB switch; and
- a cathode ray tube providing the display screen for displaying processed signals from the video processing circuit.

4. A television receiver according to claim 1, further comprising signal bus means connecting the display means and the setting means, and wherein the control means includes a system microcomputer also connected to the signal bus means.

5. A television receiver according to claim 2, further comprising a memory for storing data corresponding to the inhibited menu items or inhibited sub-menu items and signal bus means for connecting the memory, the display means and the setting means, and wherein the control means includes a system microcomputer also connected to the signal bus means, the system microcomputer reading the data stored in the memory and controlling the display means to display the inhibited menu items or inhibited sub-menu items with a reduced brightness relative to a full display brightness.

* * * * *